United States Patent [19]

Durney

[11] Patent Number: 5,063,982

[45] Date of Patent: Nov. 12, 1991

[54] HAND TOOL FOR FORMING A POCKET MORTISE AND METHOD

[76] Inventor: Max W. Durney, P.O. Box 660, Penngrove, Calif. 94951

[21] Appl. No.: 570,390

[22] Filed: Aug. 21, 1990

[51] Int. Cl.⁵ .......................... B27C 1/00; B27M 1/08
[52] U.S. Cl. .................................. 144/365; 29/33 R; 144/1 R; 144/93 R; 144/104; 144/134 D; 144/134 D; 144/367; 144/368; 269/1; 408/26; 408/103; 408/109
[58] Field of Search ................... 144/1 R, 3 R, 35 R, 144/134 R, 134 D, 136 R, 136 C, 365, 367, 104, 93 R, 368; 29/33 R; 269/1, 2; 408/26, 72 R, 72 B, 103, 108, 109, 97

[56] References Cited

U.S. PATENT DOCUMENTS

| | | | |
|---|---|---|---|
| 3,288,183 | 11/1966 | Eisbrenner | 144/104 |
| 4,235,565 | 11/1980 | Albano | 408/109 |
| 4,594,032 | 6/1986 | Warburg | 408/72 R |
| 4,603,719 | 8/1986 | Durney | 408/26 |
| 4,944,627 | 7/1980 | Durney . | |

Primary Examiner—W. Donald Bray
Attorney, Agent, or Firm—Flehr, Hohbach, Test, Albritton & Herbert

[57] ABSTRACT

A hand tool useful in forming a pocket mortise in the surface of a workpiece proximate an edge of the workpiece. The hand tool includes a clamping assembly for releasably clamping the tool to the workpiece, and a router carried by the clamp assembly and mounted for manual displacement toward the workpiece edge at an incline to progressively cut deeper into the workpiece and form an inclined pocket mortise. The hand tool also preferably carries a drill bit guide on the clamp assembly which is formed to receive and guide a drill bit from a hand drill for drilling a bore from the workpiece edge to the mortise. A method of forming a pocket mortise including the steps of clamping the clamp assembly with a movable router to a workpiece, routing the pocket mortise and then drilling a hole to the pocket mortise from the edge of the workpiece by a hand drill also is described.

18 Claims, 3 Drawing Sheets

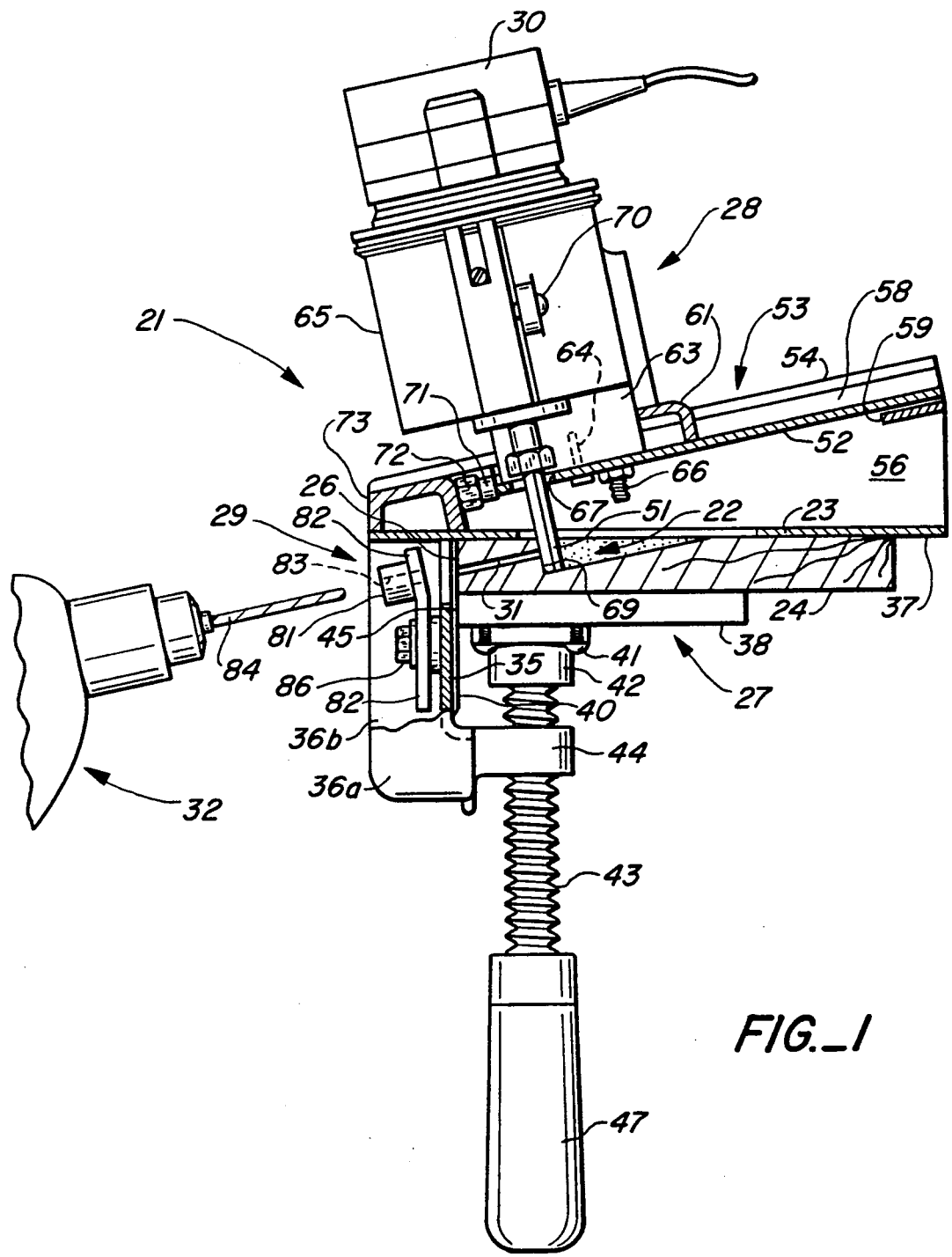
FIG._1

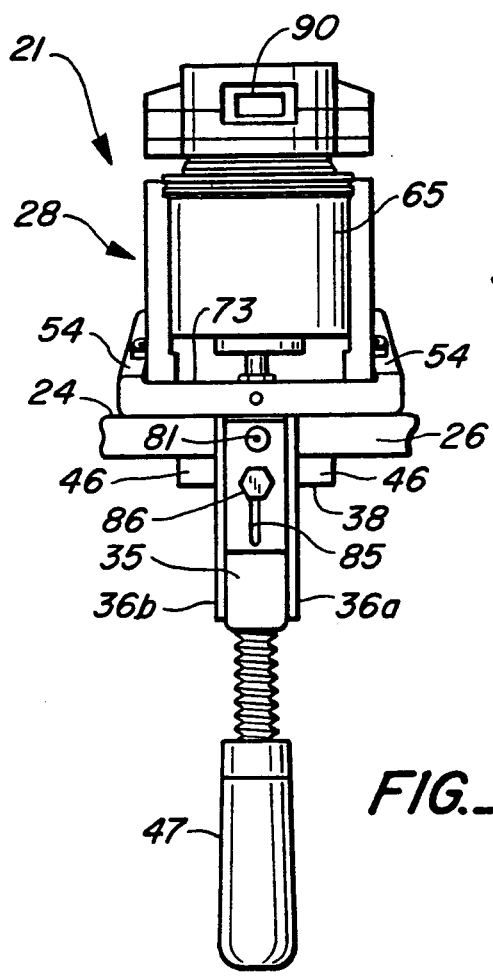
FIG._2
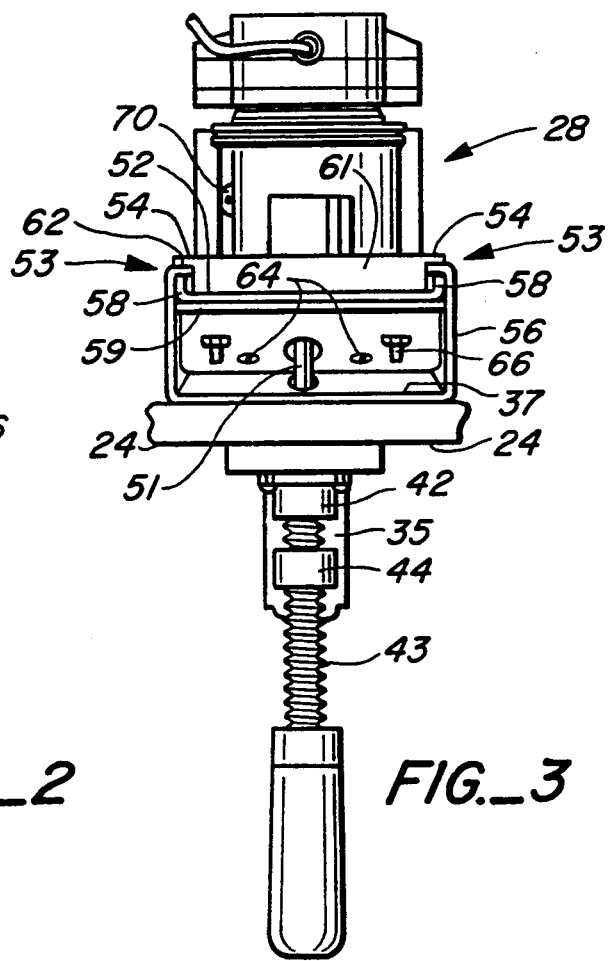
FIG._3
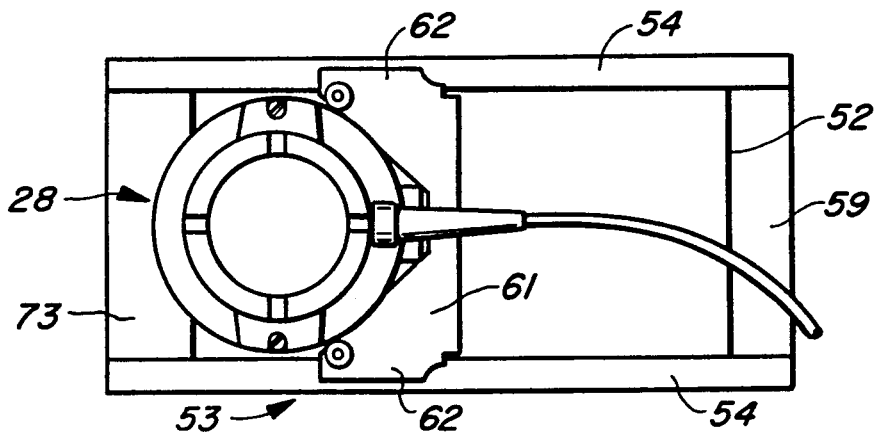
FIG._4

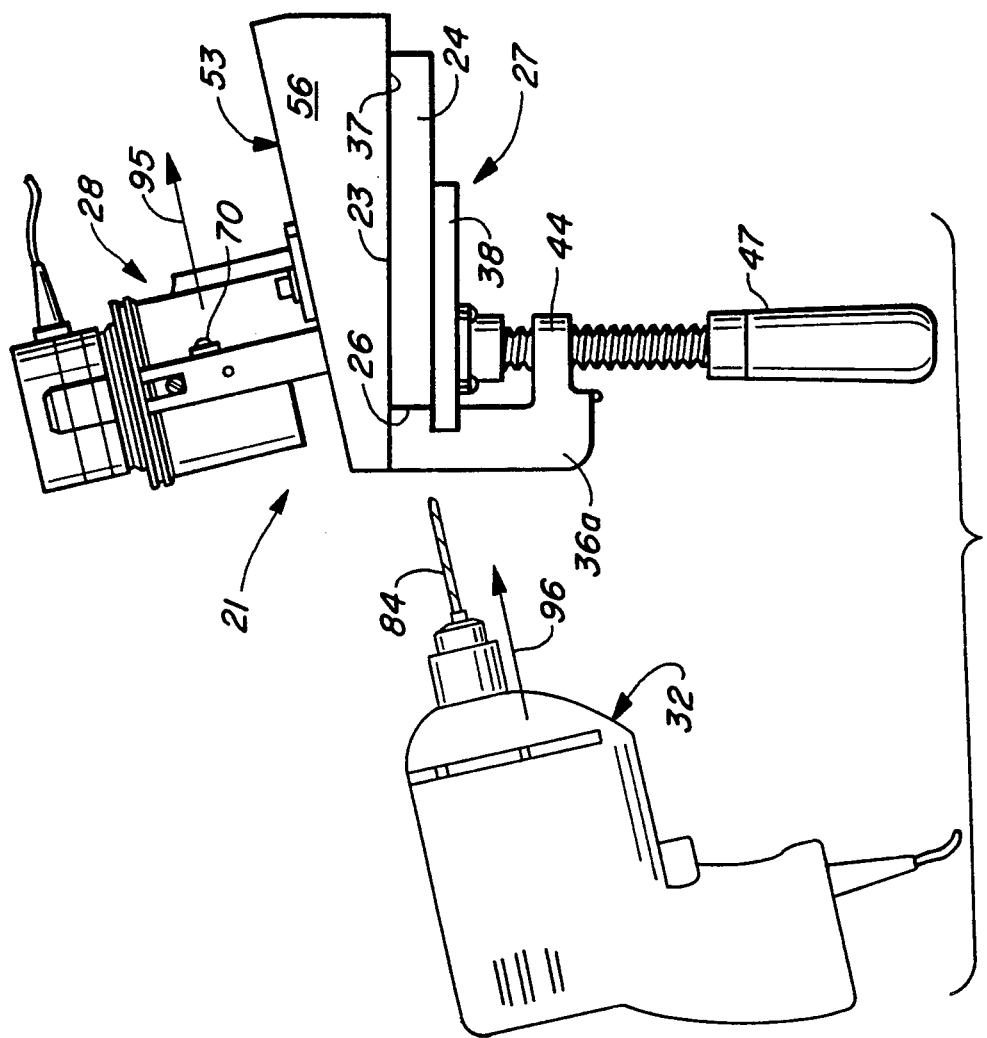
FIG._6
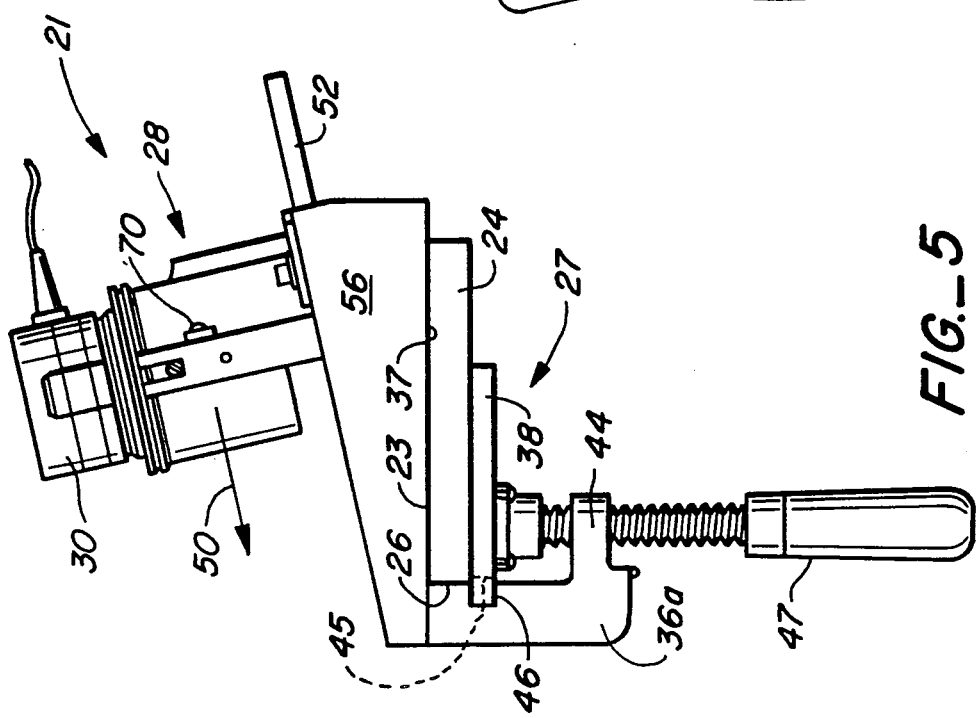
FIG._5

HAND TOOL FOR FORMING A POCKET MORTISE AND METHOD

TECHNICAL FIELD

The present invention relates, in general, to an apparatus and method for joining together two workpieces of the type often used in furniture, cabinetry or case work, and more particularly, relates to an apparatus and method for forming a pocket mortise in the surface of a workpiece so that the workpiece can be joined, for example, by a screw, to a second member.

BACKGROUND ART

There are many applications in furniture, cabinetry and case work joinery in which a pocket mortise is employed to form a joint between two workpieces. Thus, in ready-to-assemble or knock-down furniture and in connection with joining together the elements of cabinets, cases, counters and the like, pocket mortises are employed to provide a high-strength joint which often can be hidden to provide desirable cosmetic effects.

When furniture or case work is being manufactured in volume, it is feasible and quite advantageous for pocket mortises to be formed using a production or shop tool of the type described in my prior U.S. Pat. No. 4,603,719. The mortise pocket forming tool of my patent is readily adaptable (for example, by employing multiple heads) for use by manufacturers and/or job shops to produce pocket mortises of high-quality at relatively low cost. The pocket mortise forming apparatus of my patent, however, is somewhat specialized for the average carpenter, woodworker or do-it-yourself handyman to have available in their shop for the formation of only a few mortises in a few pieces of furniture or cabinetry. Thus, a carpenter or do-it-yourself woodworker is not likely to have a shop which would be sufficiently complete to have a pocket mortise forming apparatus as set forth in my U.S. Pat. No. 4,603,719. Moreover, even if such an apparatus is in the shop of a carpenter, it will not be readily available for on-site use when small projects are involved.

Nevertheless, pocket mortises are highly advantageous structures that can be utilized with a variety of mortise inserts, as for example are set forth in my U.S. Pat. No. 4,944,627, to produce joints between structural members that have many desirable qualities. Thus, while pocket mortise joints are used in manufactured or production structures the lack of a practical hand tool or in-the-field way of precisely forming pocket mortises has limited their use by woodworkers in non-production settings.

Accordingly, it is an object of the present invention to provide a hand tool which can be easily transported and used by a carpenter or woodworker to form high-quality, well-indexed pocket mortises for use in woodworking joinery applications.

Another object of the present invention is to provide a pocket mortise forming hand tool and method which is suitable for use by relatively unskilled woodworkers to form a high-quality, screw mortise joint.

Still another object of the present invention is to provide a hand tool for forming a pocket mortise in a workpiece which is highly portable, relatively inexpensive to manufacture and is easy to use.

Still a further object of the present invention is to provide a hand tool for formation of a pocket mortise which allows the woodworker to take advantage of a commonly owned woodworking hand tool, namely, the hand drill to thereby eliminate the need for integration of a drill into the hand tool.

Still a further object of the present invention is to provide a hand tool and method for forming a pocket mortise in a workpiece which requires minimal time to use, involves a minimum number of components, and produces a joint which is high in strength.

The pocket mortise forming hand tool and method of the present invention have other objects and features of advantage which will be apparent from the accompanying drawing and from the following description of the Best Mode Of Carrying Out The Invention.

SUMMARY OF THE INVENTION

The hand tool of the present invention is suitable for use in forming a pocket mortise in the surface of a workpiece proximate an edge of the workpiece. The hand tool comprises, briefly, a clamp assembly formed for releasable clamping of the tool to the workpiece proximate the edge of the workpiece and a, router carried by the clamp assembly and having a router bit with an axis rotation oriented transverse to the surface in which the mortise is to be formed. The router is mounted on the clamp assembly for displacement in a direction transverse to and toward and away from the edge and for displacement of the cutting bit on an incline to cut progressively deeper into the workpiece. The hand tool further preferably includes a drill bit guide mounted to the clamp assembly and formed to receive and guide the drill bit of a hand drill for drilling of a bore from the edge of the workpiece to the pocket mortise formed by the router. In the preferred form, the router is mounted on a carriage slidably mounted to the clamp assembly for movement along an inclined path, and the drill guide is provided as a bushing mounted on the clamp assembly in indexed relation to the mortise-forming router.

The method of forming a pocket mortise of the present invention is comprised, briefly, of the steps of clamping a clamp assembly having a movable router mounted to the clamp assembly proximate the edge of a workpiece with the router bit oriented transverse to an upper surface of the workpiece, routing an inclined pocket mortise in the workpiece by manually displacing the router along a progressively inclined path toward an edge of the workpiece, and drilling a hole from the edge of the workpiece to the pocket mortise using a hand drill. The drilling step preferably is accomplished by drilling through a drill guide carried by the clamp assembly while the clamp assembly is still clamped to the workpiece.

BRIEF DESCRIPTION OF THE DRAWING

FIG. 1 is a side elevation view, partially in cross section and broken away, of a hand tool constructed in accordance with the present invention and mounted on a workpiece and showing a hand drill for use with the hand tool.

FIG. 2 is an end elevation view in reduced scale of the hand tool of FIG. 1.

FIG. 3 is an end elevation view of an opposite end of the hand tool with the router in the moved position of FIG. 5.

FIG. 4 is a top plan view, in reduced scale, of the hand tool of FIG. 1.

FIG. 5 is a side elevation view, in reduced scale, with the hand tool in a moved position from FIG. 1 to begin formation of a pocket mortise.

FIG. 6 is a side elevation view, in reduced scale, of the hand tool corresponding to FIG. 1 with a hand drill shown before drilling a fastener bore.

BEST MODE OF CARRYING OUT THE INVENTION

In my U.S. Pat. Nos. 4,944,627 and 4,603,719 highly useful pocket mortises and fastener assemblies for mounting in such mortises are described in detail and will not be repeated herein. The pocket mortise formed by the present hand tool is not regarded as a novel portion of the present invention. As noted above, my U.S. Pat. No. 4,603,719 discloses a shop or production tool which is highly useful in forming such pocket mortises. The present invention, however, is directed to a hand-held tool which has high portability and yet can easily and rapidly be employed to form a pocket mortise of comparable precision and quality to that formed by more elaborate shop and production tools.

As best may be seen in FIG. 1, the hand tool of the present invention, generally designated 21, is designed to form a pocket mortise 22 in the top surface 23 of a workpiece 24. Mortise 22 is formed proximate an edge 26 of the workpiece, and more particularly proximate the edge which is to be joined to another member, as described in detail in U.S. Pat. Nos. 4,944,627 and 4,603,719.

Hand tool 21 preferably includes three components, namely, a clamp assembly, generally designated 27, a router assembly, generally designated 28, and drill bit guide means, generally designated 29. As used herein, however, the expression "router assembly" shall be understood to include essentially the elements above clamp portion or plate 37, such as router 30, carriage 52 and track means 53. Moreover, in the broadest form of the invention drill bit guide means 29 need not be present.

In most applications, workpiece 24 will be a board, a piece of frame stock or sheet-like member, but it will be understood that in the broadest aspect of the present invention, clamp means 27 can be formed to clamp hand tool 21 to workpieces of various sizes and descriptions. The purpose of clamp assembly 27 is to secure the hand tool to the workpiece so that pocket mortise 22, cut by router 30, and fastener receiving bore 31, produced by hand drill 32, communicate with each other or are in relatively indexed relation to form the pocket mortise.

One form of clamp assembly 27 suitable for use in securing the overall hand tool in a fixed relation to the workpiece is a clamp assembly having a generally U-shaped frame, here oriented on its side, with two horizontally oriented clamping portions and a vertically oriented connecting frame portion. Thus, two vertical, side-by-side, frame connecting portions 36a and 36b, which are joined together by central portion 35, have an upper horizontal clamping portion 37, formed to engage a substantial area of surface 23 of the workpiece fixedly mounted to an upper end of connecting frame portions 36a and 36b. Mounted in spaced relation to upper portion 37 and movable with respect thereto, is a lower clamping portion or member 38. Lower clamping portion 38 can be provided as a wooden member which is mounted by fasteners 41 to socket 42, formed to rotatably receive threaded shaft 43. Extending outwardly from frame portions 36a and 36b is a threaded sleeve 44, which threadably receives shaft 43. Inner ends 46 (FIG. 2) of lower work engaging member 38 slidably engages the frame portions 36a and 36b as member 38 is displaced axially by rotation of manually engageable handle 47.

Clamping assembly 27 also can include an edge engaging member 40 mounted to clamp connecting portions 36a and 36b so as to provide a surface for engagement of the workpiece edge 26 and preferably a low-friction surface for sliding engagement by the inner end 45 of the notch of lower clamping member 38.

The details of construction of clamp assembly 27 are broadly known in the clamping art and do not, by themselves, constitute a novel portion of the present invention.

In order to form precisely dimensioned pocket mortise 22, hand tool 21, as is the case for the shop tool of my U.S. Pat. No. 4,603,719, includes a router assembly 28 having a router 30 which is mounted with router bit 51 having an axis of rotation oriented transverse to surface 23. As will be seen from FIG. 1, bit 51 is nearly perpendicular to surface 23, but it also can be seen to be inclined at a slight angle so as to progressively cut more deeply into surface 23 as the router is advanced in the direction of arrow 50 in FIG. 5. The advantages of orientation of router bit 51 are described in more detail in my U.S. Pat. No. 4,603,719, and those advantages are present in the hand tool of the present invention.

Router 30 is movably mounted for manual displacement by the user along an inclined path (for example, about 12 degrees). This can most easily be provided by mounting router 30 on a carriage 52 which is slidably mounted to a router guide track, generally designated 53, carried by or mounted to clamp assembly 27. Track 53, as best may be seen in FIG. 3, can be provided by a pair of inwardly turned flanges 54 on upwardly extending side walls 56 of the clamp assembly upper clamping portion or plate 37. Carriage 52 can be provided by a transversely extending plate having upturned sides 58. The carriage is held up against track 54 by a transversely extending lower plate 59 beneath carriage plate 52 and a transversely extending upper plate 61 having ears (FIGS. 3 and 4) 62 which engage the top surface of flanges 54.

In order to provide additional versatility, router is removably mounted to carriage plate 52 by fasteners 64, and fasteners 66 clamp upper track engaging guide plate 61 to carriage plate 52. The carriage and guide track assembly, shown and described, is particularly well suited for use with the present invention in that it is relatively inexpensive to construct and yet is durable and permits removal of the router from the hand tool for cleaning, repair and maintenance. Router 28 can be a hand router of the type conventionally available on the market, for example, a hand router of the type made by Porter-Cable Corporation, Jackson, Tenn. It will be understood, however, that the particular carriage and track assembly for movable mounting of the router to the clamp assembly can be varied within the scope of the present invention. If desired, carriages supported by wheel assemblies or ball bearings can be employed in the hand tool of the present invention, although they tend to increase the overall cost of manufacturing the hand tool somewhat. Additionally, spring biasing means, not shown, can be employed to bias the router and carriage to the position of FIG. 5 for safety and convenience so that fit 51 does not protrude below plate 37.

As will be apparent from FIG. 1, both carriage plate 52 and clamping plate 37 must have openings therein to receive router bit 51 therethrough. Thus, a bore 67 is provided in carriage plate 52 and an elongated slot 68 is provided in clamping plate 37.

It is an important feature of the present invention that router 30 be mounted to carriage 52 in a manner permitting adjustment of the depth to which bit 51 cuts mortise 22. In the hand tool of FIG. 1, router 30 is mounted in a sleeve 65 fixedly mounted to router base 63. Sleeve 65 is clamped by fastener 70 around the body of the router. Thus, fastener 70 can be loosened to permit adjustment of the depth of router bit relative to sleeve 65 and base 63. Once the desired depth is reached, fastener 70 is tightened to clamp the router in a fixed position.

In order to limit the advance of router bit 51 toward edge 26 so that the pocket mortise will have a shoulder 69 in predetermined spaced relation to edge 26, hand tool 21 preferably includes adjustable stop means 71 which engages carriage plate 52 and limits the forward displacement of the router bit. Nut 72 allows the user to adjust stop means 71 and thereby adjust the location of shoulder 69 relative to edge 26. Stop 71 is secured to transversely extending end channel 73, in this case by welding, to upper clamping plate 37, but most preferably by die casting.

In order to reduce the size and complexity of the hand tool of the present invention, it is constructed in a manner which enables it to be used with another hand tool commonly owned by most carpenters and do-it-yourself craftsmen, namely, a hand drill. Thus, hand tool 21 is designed for use with a hand drill 32, rather than attempting to integrate into the hand tool a drill assembly, as is the case with the shop or production tool of U.S. Pat. No. 4,603,719. Hand tool 21 includes a drill bit guide assembly 29 mounted to clamp assembly 27 in a manner so as to ensure that bore 31 will extend from edge 26 of the workpiece to pocket mortise 22 formed by router 30.

In the preferred form, a guide bushing 81 is secured to a mounting flange 82 and is formed with a central opening 83 dimensioned to receive a hand drill bit 84 (FIGS. 1 and 6). Since mortise shoulder 69 is at a slight angle (about 12 degrees) to the vertical, it is preferably that the mounting flange 82 for guide 81 be at about one-half the mortise angle (most preferably about 6 degrees). This will orient guide hole 84 in a manner producing a bore 31 that will enter mortise 22 in a close to perpendicular orientation to mortise shoulder 69 and will flatten out the orientation of the fastening screw so that it will pull better across the joint. Thus, the bore 31 will be seen to slope downwardly only slightly from shoulder 69 to edge 26.

In the preferred form of the hand tool of the present invention, the mounting flange 82 is adjustably mounted to frame member 36 by fastener 86 which passes through an elongated slot 85 (FIG. 2) in the mounting flange 82. By adjusting flange 82, the location of bore 31 to mortise 22 can be adjusted so as to provide sufficient room for the head of the screw or other fastener which is passed through bore 31 during formation of the mortise joint.

While it is preferable to use drill guide bushing 81 to guide drill bit 84, it will be understood that it also would be possible to remove hand tool 21 from workpiece 24 after forming mortise 22 and drill bore 31 without guiding the same using the hand tool. The advantage of leaving the tool damped on the workpiece and using drill guide 81 is that bore 31 will be more precisely controlled and indexed relative to the mortise.

The pocket mortise forming method of the present invention and operation of the hand tool can now be described. Hand tool 21 is first clamped to edge 26 of workpiece 24 with edge 26 in engagement with clamp bearing surface member 40. The user cinches down on handle 47 to clamp the workpiece between movable lower clamp member 38 and upper stationary clamp plate 37. At the outset, the router is in the position shown in FIG. 5 and is not powered. The router can then be turned on by switch 90 (FIG. 2) and the user will manually engage the router body and advance the router toward edge 26, as indicated by arrow 50 in FIG. 5, until carriage plate 52 hits stop 71. This is the router position shown in FIGS. 2 and 6. At this point in the method, a sloping pocket mortise 22 will have been formed in upper surface 23 of the workpiece. The router is then returned manually, as indicated by arrow 95 in FIG. 6, to the position of FIG. 5 and the router turned off.

While clamp assembly 27 is still clamped to workpiece 24, hand drill 32 is used to drill bore 31 by inserting the drill bit 84 into the opening 83 in guide bushing 81, as indicated by arrow 96 in FIG. 6, and drilling until bit 84 reaches pocket mortise 22. The drill then can be removed from the guide bushing and the hand tool unclamped from the workpiece. The result will be a pocket mortise in surface 23 of the workpiece proximate edge 26 that can be used to form a high-strength joint between the workpiece and another structural member.

It will be understood, that since the clamp assembly holds the relative positions at which the router and drills will cut in fixed, indexed relation, it will be possible to perform the drilling step before the routing step. In that case, the drill has to be advanced to a position sufficiently deep into the edge 26 so as to ensure that the bore will communicate with the subsequently formed mortise 22.

As will be apparent from the above, a hand tool constructed as above described is relatively inexpensive to manufacture, and accordingly, feasible for the average handyman or carpenter to own. The hand tool provides a rapid and easily learned method for producing a pocket mortise that can advantageously be used in numerous carpentry applications. Moreover, the portability of the hand tool allows it to be clamped easily to a workbench by a separate clamp or fixture (not shown) for low-volume production runs.

The frame for the clamp assembly and guide track for the router preferably are die cast from steel, but the workpiece engaging surfaces also can all be formed of a wood, formica or other materials. Router 30 also can be removed easily from the hand tool of the present invention for other, more conventional, routing applications. The hand tool of the present invention, therefore, can be employed for multiple purposes, including general purpose routing and the formation of pocket mortises.

What is claimed is:

1. A hand tool assembly useful in forming a pocket mortise in a surface of a workpiece proximate an edge thereof comprising:

a clamp assembly formed for releasable clamping of said hand tool to said workpiece proximate said edge; and router means movably mounted to said clamp assembly by mounting means and having a router bit with an axis of rotation oriented transverse to said surface when said clamp assembly is clamped to said workpiece, said mounting means mounting said router means to said clamp assembly for manual displacement in a direction transverse to said edge and for displacement of said router bit to cut into said workpiece to form a pocket mortise proximate said edge.

2. The hand tool as defined in claim 1, and
drill bit guide means mounted on said clamp assembly and formed to receive and guide a drill bit of a hand drill for drilling of a bore from said edge to said pocket mortise.

3. The hand tool as defined in claim 1 wherein,
said clamp assembly is formed for clamping of said hand tool onto frame stock.

4. The hand tool as defined in claim 1 wherein,
said clamp assembly includes a U-shaped frame having two spaced apart parallel clamping portions, at least one of said clamping portions being adjustable for displacement toward the other of said clamping portions to clamp said hand tool to a workpiece positioned between said clamping portions.

5. The hand tool as defined in claim 1 wherein,
said router means is mounted for movement to said clamp assembly by an inclined track and a carriage mounted for movement on said track.

6. The hand tool as defined in claim 5 wherein,
said router means is mounted to said carriage, and said track is mounted in fixed relation to said clamp assembly.

7. The hand tool as defined in claim 6, and
stop means provided on said clamp assembly limiting displacement of said router means in a direction toward said edge to produce a shoulder at an end of said pocket mortise generally parallel to and spaced from said edge by a distance determined by said stop means.

8. The hand tool as defined in claim 7 wherein,
said stop means is adjustably mounted to said clamp assembly to enable changing of the distance of said shoulder from said edge.

9. The hand tool as defined in claim 2 wherein,
said clamp assembly includes an upper clamping portion formed to engage said surface and formed to receive said router bit therethrough, a track portion mounted in spaced relation above and inclined relative to said upper clamping portion, and a lower clamping portion mounted in spaced relation below said upper clamping portion and movable with respect thereto to clamp said hand tool to said workpiece between said upper clamping portion and said lower clamping portion;
a carriage slidably mounted on said track portion; and
said router means removably mounted to said carriage for movement therewith, said router bit extending from said carriage through said upper clamping portion.

10. The hand tool as defined in claim 2 wherein,
said drill bit guide means is provided in a portion of said clamp assembly extending across said edge.

11. The hand tool as defined in claim 2 wherein,
said drill bit guide means is mounted to said clamp assembly for selective adjustment of the position on said edge at which said drill bit enters said workpiece.

12. The hand tool as defined in claim 2 wherein,
said clamp assembly is provided by a U-shaped frame having a pair of spaced apart clamping portions and a connecting frame portion, said connecting frame portion being dimensioned to be positioned over and engage said edge, and
said drill bit guide means is carried by said connecting frame portion.

13. The hand tool as defined in claim 12 wherein,
said drill bit guide means is provided by a bushing having an opening therein dimensioned to receive said drill bit therethrough oriented substantially perpendicular to the orientation of said router bit.

14. The hand tool as defined in claim 13 wherein,
said drill bit guide means is mounted for selective adjustment of the position at which said drill bit enters said mortise.

15. The hand tool as defined in claim 1 wherein,
said router means is mounted to said clamp assembly for selective adjustment of the depth of cut of said router bit.

16. A method of forming a pocket mortise in one of two members to be joined together comprising the steps of:
clamping a clamp assembly, having a movable router mounted thereto, to said one of said two members proximate an edge thereof with a router cutting bit oriented transverse to an upper surface of said one of said two members;
routing a pocket mortise in said surface by manually displacing said router assembly along a path transverse to said edge to produce said pocket mortise proximate said edge; and
drilling a hole from said edge to extend said pocket mortise by using a hand drill.

17. The method as defined in claim 16 wherein,
said drilling step is accomplished by using drill bit guide means carried by said clamp assembly while said clamp assembly is clamped to said one of said members.

18. The method as defined in claim 17, and the step of:
indexing said router for movement relative to said edge and indexing said drill bit guide means relative to said edge.

* * * * *